(12) United States Patent
Fesseler et al.

(10) Patent No.: US 12,542,248 B2
(45) Date of Patent: Feb. 3, 2026

(54) OPTICAL MONITORING SYSTEM FOR AN OPTICAL DISPLAY ELEMENT

(71) Applicant: ACD Antriebstechnik GmbH, Achstetten (DE)

(72) Inventors: Aaron Fesseler, Achstetten (DE); Einar Fesseler, Achstetten (DE)

(73) Assignee: ACD Antriebstechnik GmbH, Achstetten (DE)

( * ) Notice: Subject to any disclaimer, the term of this patent is extended or adjusted under 35 U.S.C. 154(b) by 242 days.

(21) Appl. No.: 18/568,053

(22) PCT Filed: Jun. 7, 2022

(86) PCT No.: PCT/EP2022/065330
§ 371 (c)(1),
(2) Date: Dec. 7, 2023

(87) PCT Pub. No.: WO2022/258575
PCT Pub. Date: Dec. 15, 2022

(65) Prior Publication Data
US 2024/0290555 A1 Aug. 29, 2024

(30) Foreign Application Priority Data
Jun. 9, 2021 (DE) .................. 10 2021 114 870.7

(51) Int. Cl.
*G08B 5/22* (2006.01)
*G09F 9/33* (2006.01)
(Continued)

(52) U.S. Cl.
CPC .......... *H01H 3/022* (2013.01); *H01H 9/161* (2013.01); *H01H 2300/052* (2013.01)

(58) Field of Classification Search
CPC ... H01H 3/022; H01H 9/161; H01H 2300/052
See application file for complete search history.

(56) References Cited

U.S. PATENT DOCUMENTS 5,263,570 A * 11/1993 Stonemark ............. B65G 43/00
198/573
6,272,001 B1 * 8/2001 Futsuhara .............. H03K 17/97
361/170
(Continued)

FOREIGN PATENT DOCUMENTS

AT 518362 A1 9/2017
DE 269040 A1 6/1989
(Continued)

*Primary Examiner* — Toan N Pham
(74) *Attorney, Agent, or Firm* — 24IP Law Group USA, PLLC; Timothy R DeWitt

(57) ABSTRACT

A monitoring system for an optical display element of an emergency stop switch, wherein the monitoring system comprises an operating element with optical display element, an optical sensor and safety electronics. The safety electronics are connected to the optical display element and the optical sensor. The safety electronics comprise a safe output and a safe input and are connected to the optical display element via the safe output and are connected to the optical sensor via the safe input. It can thereby be ensured that the optical display element functions reliably or is not faulty in order to avoid fatal consequences for life and limb. The optical display element can comprise a single display element or a plurality of display elements.

15 Claims, 6 Drawing Sheets

(51) Int. Cl.
*H01H 3/02* (2006.01)
*H01H 9/16* (2006.01)

(56) References Cited

U.S. PATENT DOCUMENTS 8,688,244 B2 *  4/2014  Kalhoff .............. G05B 19/4183
                                              901/6
9,115,848 B1 *  8/2015  Gingras .................... F16P 7/00

FOREIGN PATENT DOCUMENTS

| | | |
|---|---|---|
| DE | 19919012 A1 | 11/2000 |
| DE | 102011016137 A1 | 10/2012 |
| DE | 102014113135 A1 | 3/2016 |
| DE | 212017000166 U1 | 1/2019 |
| JP | H05-070900 | 6/1995 |
| JP | 2004-014210 | 1/2004 |
| JP | 2010-033797 | 2/2010 |
| JP | 2014-167681 | 9/2014 |
| JP | 2020-077596 | 5/2020 |
| WO | 2017139817 A1 | 8/2017 |

\* cited by examiner

OSa   OSb   OSc

OPTICAL MONITORING SYSTEM FOR AN OPTICAL DISPLAY ELEMENT

CROSS REFERENCE TO RELATED APPLICATIONS

This application is a U.S. national stage of International Application No. PCT/EP2022/065330, which claims priority from German patent application No. DE 10 2021 114 870, which was filed on 9 Jun. 2021. The above-referenced applications are hereby incorporated by reference in their entirety.

BACKGROUND OF THE INVENTION

Field of the Invention

The invention relates to the field of control technology or safety technology.

Brief Description of the Related Art

So-called "emergency stop switches" serve the reliable protection of people from injuries and against damage to machines or systems or vehicles. In German language usage, the two functions emergency-shut-off (=switching off, interrupting the energy supply, interrupting the power supply of a connected machine drive) and emergency-stop (=stopping, shutting down movable machine parts while maintaining the power supply of a connected machine drive) are often subsumed under the term "Not-Aus". The term "Not-Aus" is used as a German counterpart for the English term "emergency switching off". However, there were and are German standard editions which also incorrectly reproduce the English term "emergency stop" with the expression "Not-Aus". To date, for example, the German version of DIN EN 60947-5-5 incorrectly uses the term "Not-Aus" for the English term "emergency stop", i.e. in reality describes the "Not-Halt".

A malfunction of machines can lead to a risk to people. In order that in the case of directly imminent or entering risks the machine in question can be stopped immediately and at any time, the Machine Directive 2006/42/EC of the European Parliament and of the Council requires that each machine must be equipped with one or more emergency stop switches. Furthermore, this machine directive imposes design requirements on these components. One of the requirements is that the emergency stop switch must have clearly recognizable, readily visible and quickly accessible control parts. In the case of active emergency stop switches which have additional display elements, such as LEDs, for example, the function of the switch is visually displayed. If the emergency stop switches are mounted on disconnectable or wireless or mobile operating stations, the standard DIN EN ISO 13850 requires, inter alia, measures to be taken in order to avoid confusion between active, i.e. illuminated, and non-active, i.e. non-illuminated, emergency stop switches.

German patent application DE 19 919 012 A1 teaches a method for identifying activated, separable emergency shut-off command devices. The method is characterized in that an additional device is added to the emergency shut-off command device, which activates the specific color and/or the specific colors of the emergency shut-off command device only when the latter is properly connected to the system and/or machine in any way and is connected to voltage. As a result, a visual signal is generated which indicates readiness for operation of the emergency shut-off command device.

International patent application WO 2017 139 817 A1 discloses a control system for electrically controlled systems. The control system comprises at least one portable, mobile hand-held operating device for displaying information and for inputting control commands by an operator. The hand-held operating device has at least one manually actuable safety switching element, wherein a lighting device is assigned to the safety switching element. The control system comprises a lighting control device which is designed for electrically and/or electronically controlled adaptation of a visually perceptible luminous intensity of the lighting device.

Emergency stop switches with display elements are therefore known. FIG. 1 illustrates a further example of an emergency stop switch. The emergency stop switch comprises two switches S1 and S2 which can be operated via an operating element 5 from an operated to a non-operated position. The two switches S1 and S2 are connected to safety electronics. An optical display element LM, usually an LED, is provided in the operating element 5, wherein the optical display element LM is driven in two channels and is monitored in a dynamically controlled manner with two-channel voltage feedback. The optical display element LM can comprise a single display element or a plurality of display elements. The monitoring is effected by a first probe M1 and a second probe M2. The first probe M1 measures a current of the optical display element LM. The second probe M2 measures a voltage of the optical display element LM. The safety electronics SE thus monitors the function of the optical display element LM by driving the optical display element LM with current or voltage and measuring the current or voltage with the first or second probe M1, M2. If a deviation occurs between driving and measurement, a malfunction of the emergency stop switch is concluded by the safety electronics SE.

However, this type of monitoring entails risks with regard to a reliable statement about the function of the optical display element LM. It is known that, on account of different factors, optical display elements, such as LEDs, for example, become defective and a current or a voltage is identified via the feedback or feedback signal, but without the LED emitting an optical signal.

This has a high effect on a degree of safety required for the application. This is because the requirements from the risk assessment of a present risk lead to a specific requirement of the degree of safety. Depending on the standard, designations of the degree of safety, such as "performance level" PL a-e or "safety integrity level" SIL1-SIL3, for example, are known. On the basis of the designation and the associated level of the degree of safety, an incorrect statement about the function of the optical display element LM can lead to safety-relevant difficulties. The high requirements on the implementation of mobile emergency stop systems cannot be complied with by the incorrect statement about the function of the optical display element LM.

Particularly in the case of emergency stop switches on mobile emergency stop systems, this type of monitoring is particularly risky. Such mobile emergency stop systems are rather rare and have to meet particularly high safety requirements. In particular, in addition to the high safety requirements in comparison with stationary emergency stop systems, the mobile emergency stop systems furthermore have to meet the particularly high measures and guidelines according to the correspondingly applicable and known standards. In this case, the reliable function of the optical display element is a particularly important safety feature.

SUMMARY OF THE INVENTION

The present application discloses a monitoring system for an optical display element of an emergency stop switch, wherein the monitoring system comprises an operating element with optical display element and an optical sensor. Safety electronics are connected to the optical display element and the optical sensor. It can thereby be ensured that the optical display element functions reliably or is not faulty in order to avoid fatal consequences for life and limb. The optical display element LM can comprise a single display element or a plurality of display elements.

According to an aspect, the safety electronics comprise a safe output and a safe input and are connected to the optical display element via the safe output. The optical sensor is connected via the safe input. The optical display element and the optical sensor are thereby mechanically and electrically connected to the safety electronics in such a way that when the safe output switches, the safe input detects this switching process in any case.

Safe output therefore means that despite a fault at the output it can still be safely switched off and a fault at the output is reliably detected. This is the case, for example, when one of the channels of the safety electronics has a fault (from low-impedance to high-impedance) and can no longer be switched. A fault of this type is unambiguously detected by the feedback signal. Despite this, it can still be safely switched off with the other ones of the channels. Likewise, a safe input means that the input can still be read in and a fault at the safe input is reliably detected. A fault can be understood to mean, for example, the absence of a feedback signal at the safety electronics via at least one channel. The fault of one of the safe inputs of the safety electronics is in this case detected by deviating feedback signals between the two channels, wherein the safe input is continuously checked by interruption and measurement of the signal and by comparison (dynamization) in order to detect the fault.

According to one aspect, the monitoring system further comprises a fiber optic cable which guides an optical signal of the optical display element to the optical sensor. As a result, a specific distance between optical display element and optical sensor can be overcome.

According to a further aspect, the optical sensor comprises at least one of a photoresistor, a photodiode and a phototransistor. The optical sensor can therefore be optimally adapted to an individual application.

According to a further aspect, the optical display element comprises a plurality of display elements and the optical sensor comprises a plurality of optical sensors. The number of optical display elements and optical sensors is therefore not limited. The number of optical sensors or optical display elements depends on the safety requirements and risk potential of a monitored system (installation, machine, motor, etc.). The risk assessment determines the required PL (performance level) or SIL (safety integrity level). These are defined by the structure of the safety electronics, component reliability, fault detection, etc.

According to a further aspect, the safe output comprises at least one first output contact and at least one second output contact. The safe input comprises at least one first input contact and at least one second input contact. As a result, it is possible to link a plurality of components to the safety electronics.

The present disclosure comprises a method for a monitoring system for an optical display element of an emergency stop switch. The method comprises generation of an optical signal by supplying an optical display element with electric current or an electric voltage via a safety electronics. The method further comprises measurement of the optical signal via an optical sensor by the safety electronics. In this case, the emitted optical signal of the optical display element is measured. The method further comprises interruption of the generation of the optical signal for a duration, and measurement of the interruption of the optical signal via the optical sensor by the safety electronics. This step can be repeated or is repeated in order to increase the safety of the system. The method further comprises comparison of the generated optical signal with the measured optical signal when the electric current or voltage is present by the safety electronics. On the basis of the comparison, a conclusion is drawn about the functionality of the optical display element and therefore about the system. The method further comprises output of a warning signal in the case of a deviating comparison of the generated optical signal and the measured optical signal when the electric current is present.

The method ensures that the optical display element LM, if it is to be illuminated, is also illuminated or is active. In return, this method ensures that the optical display element LM is not illuminated if it is not to be illuminated or is inactive. If deviations occur during the comparison of the generated optical signal with the measured optical signal, this leads to the optical display element LM, as an information source about the operating state of a system, no longer being relied upon. Consequently, the emergency stop function of the system is also no longer relied upon, which leads to effects of a wide variety of types. The effect can lead, for example, from the output of a warning signal to a complete shutting down of the system. If, in a non-limiting example, the safety electronics SE detects a malfunction of the display element LM, the emergency stop function of the actual emergency stop switch is thus triggered, since this mobile emergency stop system is no longer relied upon.

According to one aspect, the interruption of the generation of the optical signal in the case of a single-channel connection between the safety electronics and the optical display element can be repeated successively in time. As a result, the safety of the system can be increased.

According to one aspect, the interruption of the generation of the optical signal in the case of a multi-channel or n-channel connection between the safety electronics and the optical display element can be repeated simultaneously. As a result, the safety of the system can be increased even further.

According to one aspect, during the measurement of the optical signal, at least one of a parameter of the optical signal or a presence of the optical signal is measured by the safety electronics. The parameter of the optical signal comprises at least one of a light spectrum, light flux, illuminance or special modulation. As a result, it is possible to set different configurations of the optical signal and to detect them by the optical sensor.

According to one aspect, the output of the warning signal or the detection of the malfunction is effected at a receiving point in a wireless or wired manner. As a result, the warning signal can be transmitted to a specific location in order to increase the safety.

BRIEF DESCRIPTION OF THE DRAWINGS

A more complete understanding of the invention and many advantages associated therewith will be readily achieved when this is considered by reference to the following detailed description in connection with the accompanying figures.

DETAILED DESCRIPTION OF THE INVENTION

The invention will now be described with reference to the figures. It goes without saying that the aspects of the invention described here are only examples and in no way restrict the scope of protection of the claims. The invention is defined by the claims and their equivalents. It goes without saying that features of one aspect of the invention can be combined with a feature of another aspect or other aspects of the invention, provided that they are not mutually exclusive.

Figure 1:
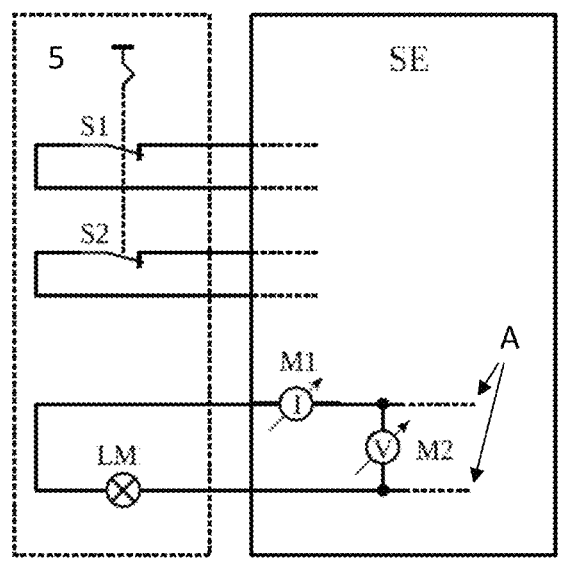
FIG. 1 illustrates a schematic illustration of an emergency-stop switch according to the background of the invention.
Figure 2:
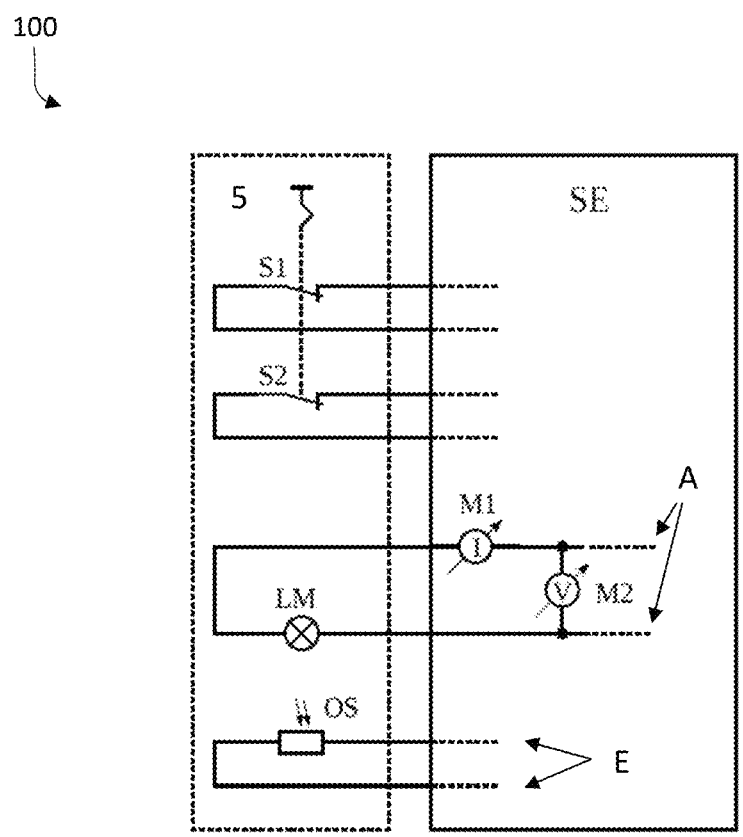
FIG. 2 illustrates a schematic illustration of a monitoring system for an emergency-stop switch according to a first aspect.

FIG. 2 is a schematic illustration of a monitoring system 100 for an emergency-stop switch according to a first aspect. The monitoring system 100 comprises an operating element 5 and safety electronics SE. The operating element 5 comprises a first switch S1, a second switch S2, an optical display element LM and an optical sensor OS. The operating element 5 is at least one of a switch, lever, button or pushbutton for rotating, (shifting), pushing or pulling.

The first switch S1 and the second switch S2 are connected to the safety electronics SE. The first switch S1 and the second switch S2 are dependent on the configuration of the operating element 5. The first switch S1 and the second switch S2 of the above-mentioned types of the operating element 5 are known and are therefore not described further in detail here.

The optical display element LM is capable of generating or converting an optical signal on the basis of an electric signal, such as a current and/or a voltage, for example. In a non-limiting example, the optical display element LM is an LED (light-emitting diode) or a bulb. In this case, the optical display element LM comprises at least one single optical display element. The optical display element LM can also comprise a plurality of single display elements LM. The frequency spectrum of the optical signal extends from visible light into the near and mid-infrared and can be modulated by the safety electronics SE.

The optical display element LM is connected to the single-channel or multi-channel safe outputs of the safety electronics SE in a single-channel or multi-channel manner. The safety electronics SE control the optical display element LM with the electric signal and can influence or modulate the electric signal. By influencing the electric signal, one or more parameters of the optical signal can be set. The adjustable parameters of the optical signal are at least one of a light spectrum, light flux, illuminance or special modulation. As a result, the safety of the emergency stop switch is increased, and an application of the emergency stop switch can be individually adapted.

An exemplary structure of the safety electronics SE will now be described with reference to FIGS. 3A to 4B.

FIGS. 3A to 3D illustrate selected examples and possibilities, which do not restrict the invention, of how the safety electronics SE can be configured in a two-channel or multi-channel manner at the safe output A with regard to switching off the installation or machine. If the safety electronics SE comprises a plurality of safe inputs E and a plurality of safe outputs A, these inputs E and outputs A can be designated as channels K. This is then referred to as a multi-channel or n-channel implementation. In the event of a failure of the switching off of a plurality of, for example n−1, channels, the installation can still be reliably switched off via the remaining channel. For example, in the event of a failure of four of five channels, the installation can still be reliably switched off. Accordingly, the safety in the case of a multi-channel implementation is the higher, the more channels are adapted. If the safety electronics SE comprise only one safe input E and one safe output A, forming a channel, this is referred to as an external single-channel implementation, consisting of the display element LM and/or the optical sensor OS. Any desired multi-channel implementation can nevertheless be present internally.

At or after each of the channels K, a feedback signal BACK is tapped off and fed back to the safety electronics SE in order to monitor the switching of the channels K with respect to the safety or the degree of safety. In one aspect, the feedback signal BACK illustrates a basic implementation of the safe output A. In a further aspect, the feedback signal BACK is required for the basic implementation of the safe output A. Via the feedback signal BACK, faults can be reliably detected by the safety electronics SE and thus form the safe output A.

Figure 3A:
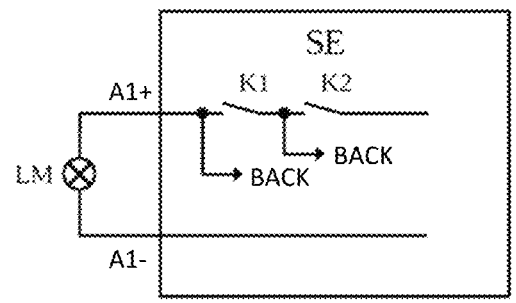
FIGS. 3A to 3D illustrate first aspects of safety electronics.

As illustrated in FIG. 3A, the safety electronics SE are implemented in two channels with the first channel K1 and a second channel K2. The first safe output A comprises the first channel K1 and the second channel K2. The display element LM is connected to an output contact A1+ via both channels K1 and K2 and is connected to the safety electronics SE on the other hand at a second output contact A1−.

Figure 3B:
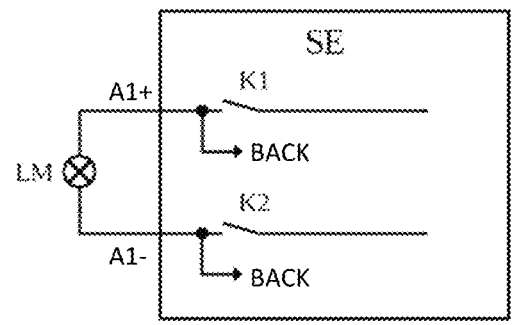

FIG. 3B illustrates a second aspect of the assembly from FIG. 3A, but with the difference that the second channel K2 is arranged at the second output contact A1− of the safe output A.

Figure 3C:
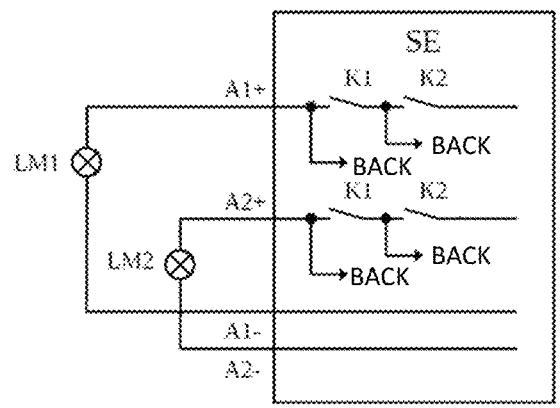

FIG. 3C illustrates a further aspect when a first display element LM1 and a second display element LM2 are connected to the safety electronics SE for monitoring. In this case, the illustrated configuration corresponds to the configuration from FIG. 3A, but in two-channel form. The first display element LM1 is separately connected to the output contact A1+ via both channels K1 and K2 and is connected to the safety electronics SE on the other hand at the second output contact A1−. The second display element LM2 is separately connected to an output contact A2+ via both channels K1 and K2 and is connected to the safety electronics SE on the other hand at a second output contact A2−. This example shows how a plurality of display elements LM can be separately connected and monitored at a safe output of the safety electronics SE.

Figure 3D:
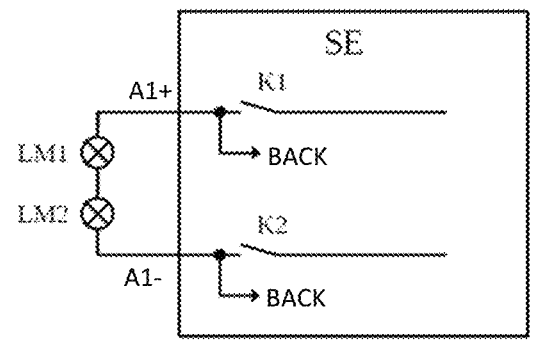

FIG. 3D illustrates a second aspect of the assembly from FIG. 3B, but with the difference that the first display element LM1 and the second display element LM2 are connected in series and are connected to the safety electronics via the first and second output contacts A1+, A1−. In this case, the first channel K1 is provided at the first output contact A1+ and the second channel K2 is provided at the second output contact A1−.

Figure 4A:
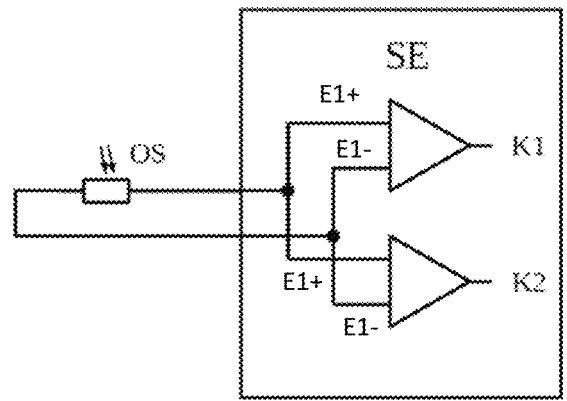
FIGS. 4A and 4B illustrate second aspects of safety electronics.
Figure 4B:
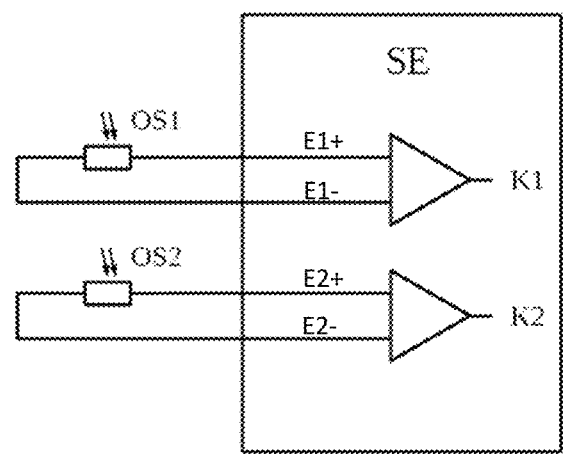

FIGS. 4A and 4B illustrate selected examples and possibilities, which do not restrict the invention, of how the safety electronics SE can be configured in a single-channel or n-channel manner at the safe input E. The input E can be monitored via the switch and the feedback. In the event of a failure of n−1 channels, a valid input signal is still detected. For example, in the event of a failure of two of three channels, the safety electronics SE can still reliably detect the input signal via the feedback signal BACK.

FIG. 4A illustrates the safety electronics SE with a single-channel connection, comprising channel K1 and channel K2, of the optical sensor OS. The optical sensor OS is connected to the safety electronics SE via a first safe input E1 with the input contacts E1+ and E1− with the first channel K1 and the second channel K2, respectively.

FIG. 4B illustrates a further aspect of how a plurality of optical sensors OS can be connected to the safe input E of the safety electronics SE. In this case, a first optical sensor OS1 is connected to the safety electronics SE via the first channel K1. A second optical sensor OS2 is connected to the safety electronics SE via the second channel K2, separately from the first channel K1. This results in a completely two-channel system in which an internal and external two-channel implementation is present.

The examples and possibilities, as illustrated in FIGS. 3A to 4B, of how the display element LM can be connected to the safe output(s) A and optical sensors OS can be connected to the safe input(s) E with the safety electronics SE can accordingly be combined with one another in such a way that the combination is expedient and desired or is not mutually exclusive.

Figure 5:
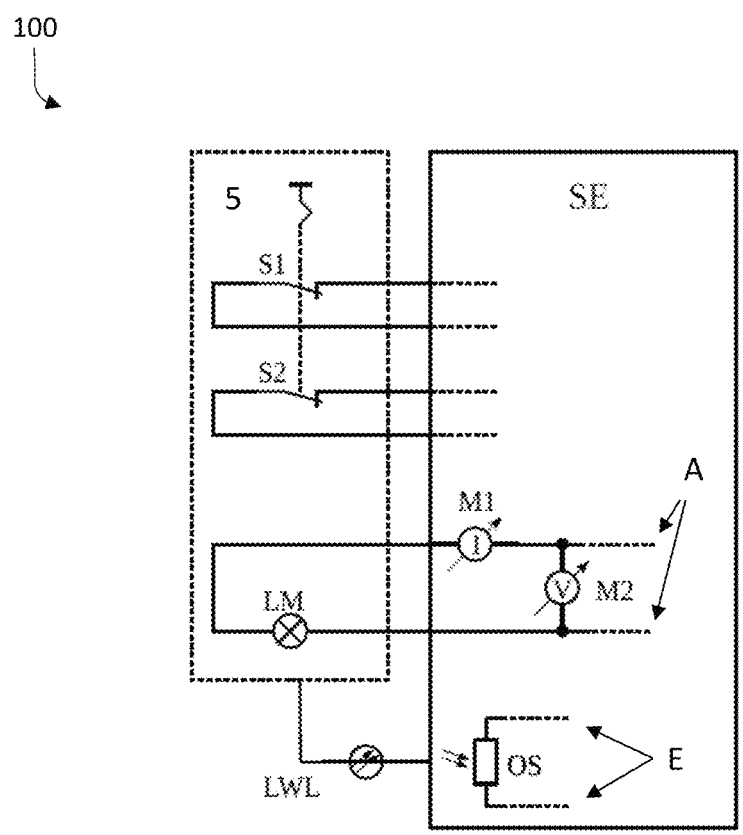
FIG. 5 illustrates a schematic illustration of a monitoring system for an emergency-stop switch according to a second aspect.

FIG. 5 shows a schematic illustration of the monitoring system 100 for an emergency-stop switch according to a second aspect. In this case, the monitoring system 100 according to the second aspect differs from the monitoring system 100 according to the first aspect in that the optical sensor OS is not accommodated in the operating element 5. The optical sensor OS of the monitoring system 100 according to the second aspect is provided at the safety electronics SE. The optical signal of the optical display element LM is fed from the optical display element LM via a fiber optic cable LWL to the optical sensor OS. The structure of the remaining components corresponds to that of the monitoring system 100 according to the first aspect. For this reason, the same components are provided with the same reference signs and are not repeated at this point.

Figure 6:
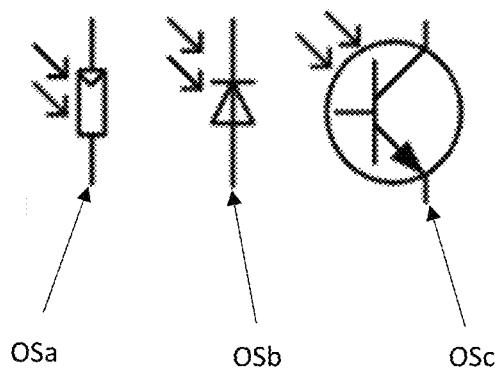
FIG. 6 shows examples of optical sensors.

FIG. 6 shows different examples of the optical sensor OS of the monitoring system 100 according to the first and second aspects. The optical sensor OS comprises at least one of a photoresistor OSa, photodiode OSb and phototransistor OSc.

The more light falls on the photoresistor OSa, the smaller its electrical resistance becomes. The cause of this function is the internal photoelectric effect in a layer which consists of an amorphous semiconductor. In comparison with other light sensors, photoresistors react very slowly.

The photodiode OSb is a semiconductor diode which converts light in the visible, infrared or ultraviolet range, at a p-n junction or pin junction by the internal photoelectric effect into an electric current or an electric voltage in order to receive the information transmitted with the optical signal.

The phototransistor OSc comprises a light-sensitive photodiode with connected amplifier transistor. The light-sensitive photodiode lies in terms of circuitry parallel to the collector-base terminals of the transistor. Incident light allows a low current to flow through the internal photoelectric effect. This current is amplified in the transistor by the current amplification factor to the collector current.

At this location, reference is made to the literature with regard to the known photoelectric effect.

Figure 7:
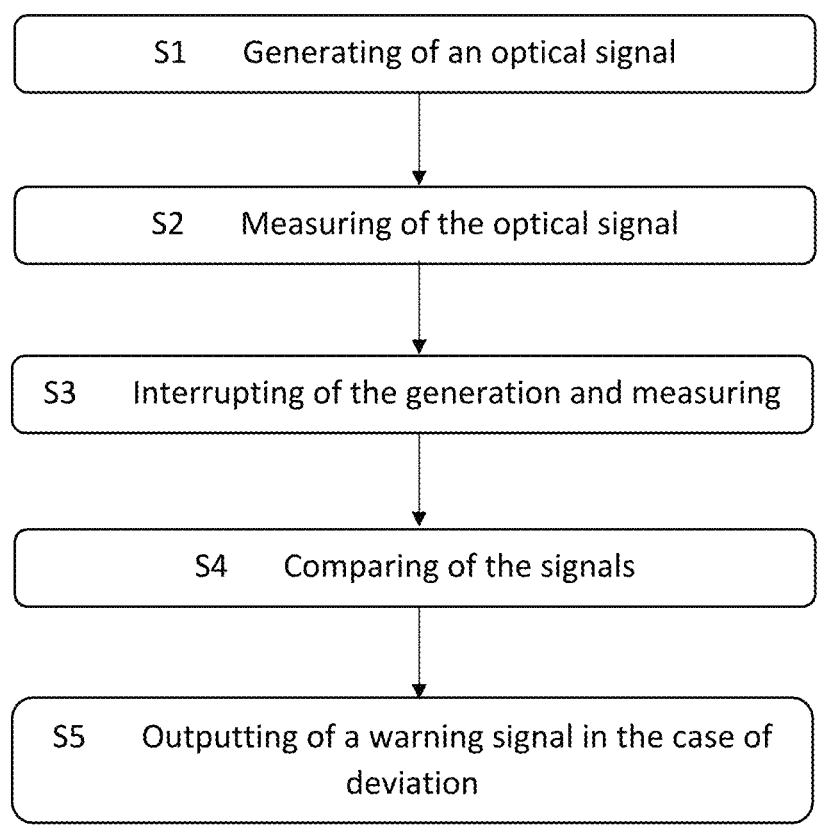
FIG. 7 illustrates a flow chart for a method for a monitoring system for the emergency-stop switch according to FIGS. 2 and 5.

FIG. 7 illustrates a flow chart for a method for a monitoring system 100 for the emergency-stop switch according to the first and second aspects. In step S1, the optical signal is generated by the safety electronics SE by driving the optical display element LM by an electric signal. At the same time, at or after each of the channels K, the electric signal is tapped off as a feedback signal BACK and fed back to the safety electronics SE in order to monitor the switching of the channels K with respect to the safety or the degree of safety. In step S2, the optical signal is measured with the optical sensor OS. In step S2, at least one of the parameter of the optical signal or a presence of the optical signal is measured. In this case, at least one of a light spectrum, light flux, illuminance or special modulation of the optical signal is measured. In step S3, the driving of the optical display element LM by an electric signal is interrupted for a duration to via the safety electronics SE. In the case of a single-channel connection between the safety electronics SE and the optical display element LM, the interruption can be repeated successively in time. In the case of a multi-channel connection between the safety electronics SE and the optical display element LM (see FIGS. 3A, 3B), the interruption can be repeated simultaneously or offset in time. By the interruptions offset in time, cross-connections between the safe outputs A, the safe inputs E and between the safe outputs A and the safe inputs E among one another can be detected. This interruption/these interruptions is/are measured with the at least one optical sensor OS. In step S4, the generated electric signal is compared with the measured optical signal by the safety electronics SE. The interruption and measurement of the electric signal and the comparison are designated as "dynamization". By the dynamization, the safe input(s) E and safe output(s) A can thus be continuously monitored for function. All faults possibly occurring can thus be detected at the latest at the next time interval of the dynamization. The degree of dynamization, that is to say how often and when a time interval is repeated, is proportional to the safety requirement of systems. The safety requirement depends on respective risk potentials or risk situations. Thus, for example, the safety electronics and the functions thereof in nuclear power plants are monitored in a virtually continuously dynamically controlled manner. The dynamization can therefore also be regarded as a type of function test. If it is technically ensured that the system is constructed as a redundant system in a separate isolated implementation, with the result that, for example, no cross-connections or ground connections can occur mechanically, a dynamization can also be completely dispensed with.

In step S5, a warning signal is output if the generated optical signal, depending on the electric signal, deviates from the measured optical signal. The output of the warning signal is effected in a wireless or wired manner to a receiving point. The warning signal can be an analogue or digital signal. The receiving point can generate a control command and/or an acoustic or optical signal from the warning signal. For example, the control command is a shutting down of the machine.

REFERENCE SIGNS 100 monitoring system
5 operating element
LMx display element
OSx optical sensor
SE safety electronics
A safe output
Ax+, Ax− output contact
E safe input
Ex+, Ex− input contact
LWL fiber optic cable
Sx switch
Mx probe
OSa photoresistor
OSb photodiode
OSc phototransistor
$t_D$ duration
PL performance level
SIL safety integrity level

The invention claimed is:

1. A monitoring system for an optical display element of an emergency stop switch, the monitoring system comprising:
    an operating element comprising the optical display element,
    an optical sensor, and
    safety electronics connected to the optical display element and the optical sensor, wherein
the safety electronics comprise a safe output and a safe input and the safety electronics are connected to the optical display element via the safe output and the safety electronics are connected to the optical sensor via the safe input.

2. A monitoring system for an optical display element of an emergency stop switch, the monitoring system comprising:
    an operating element comprising the optical display element,
    at least one fiber optic cable, and
    safety electronics comprising an optical sensor, wherein
    the safety electronics comprise a safe output and a safe input and the safety electronics are connected to the optical display element via the safe output and the safety electronics are connected to the optical sensor via the safe input, and the at least one fiber optic cable guides an optical signal of the optical display element to the optical sensor.

3. The monitoring system according to claim 1, wherein the safety electronics are connected to the optical display element via a first channel and a second channel.

4. The monitoring system according to claim 1, wherein the safety electronics are connected to the optical sensor via a first channel and a second channel.

5. The monitoring system according to claim 3, wherein an electric current or voltage from the safety electronics is fed back as a feedback signal to the safety electronics via at least one of the first channel and the second channel.

6. The monitoring system according to claim 1, wherein the optical sensor comprises at least one of a photoresistor, a photodiode and a phototransistor.

7. The monitoring system according to claim 1, wherein the optical display element comprises at least one display element and/or the optical sensor comprises at least one optical sensor.

8. The monitoring system according to claim 1, wherein the safe output comprises at least one first output contact and at least one second output contact.

9. The monitoring system according to claim 1, wherein the safe input comprises at least one first input contact and at least one second input contact.

10. A method for a monitoring system for an optical display element of an emergency stop switch, comprising
    generating of an optical signal by supplying an optical display element with electric current or voltage via a safety electronics;
    measuring of the optical signal via an optical sensor by the safety electronics;
    interrupting of the generation of the optical signal for a duration ($t_D$), and measuring of the interruption of the optical signal via the optical sensor by the safety electronics;
    comparing of the generated optical signal with the measured optical signal when the electric current or voltage is present by the safety electronics; and
    outputting of a warning signal in the case of a deviating comparison of the generated optical signal and the measured optical signal when the electric current is present.

11. The method according to claim 10, further comprising continuous monitoring of at least one of a safe input and a safe output of the safety electronics by repeating the interruption and measurement of the optical signal and the comparison thereof.

12. The method according to claim 10, wherein the interrupting of the generation of the optical signal in the case of a single-channel connection between the safety electronics and the optical display element can be repeated successively in time.

13. The method according to claim 10, wherein the interrupting of the generation of the optical signal in the case of a multi-channel connection between the safety electronics and the optical display element can be repeated simultaneously.

14. The method according to claim 10, wherein during the measuring of the optical signal, at least one of a parameter of the optical signal or a presence of the optical signal is measured by the safety electronics, wherein the parameter of the optical signal comprises at least one of a light spectrum, light flux, illuminance or special modulation.

15. The method according to claim 10, wherein the outputting of the warning signal to a receiving point is effected by wireless or wired.

* * * * *